United States Patent Office 2,743,273
Patented Apr. 24, 1956

2,743,273

MEROCYANINE DYES CONTAINING A CHAIN SUBSTITUENT

Edward Bowes Knott, Wealdstone, England, assignor to Eastman Kodak Company, Rochester, N. Y., a corporation of New Jersey No Drawing. Application September 15, 1952, Serial No. 309,743

10 Claims. (Cl. 260—240.4)

This invention relates to merocyanine dyes containing a chain substituent. More particularly, this invention relates to merocyanine dyes containing an alkoxyl substituent on the chain.

Certain merocarbocyanine dyes containing an alkoxyl substituent on the chain have been previously described. See, for example, Brooker and White U. S. Patents 2,478,366, issued August 9, 1949, and 2,494,031, issued January 10, 1950. The merocarbocyanine dyes of Brooker and White have alkoxyl groups attached to the carbon atom adjacent to the basic nucleus, and the ketomethylene nuclei are rhodanine or 2-thio-2,4(3,5)-oxazoledione.

I have found a new class of merocyanine dyes containing an alkoxyl group attached to the carbon atom adjacent to the ketomethylene nucleus, and wherein the ketomethylene nucleus is of a certain type.

It is, accordingly, an object of my invention to provide new merocyanine dyes. Still another object is to provide a method for making these new dyes. Another object is to provide photographic silver halide emulsions sensitized with my new dyes. Other objects will become apparent from the following description and examples.

The new merocyanine dyes of my invention can be represented by the following general formula:

I.

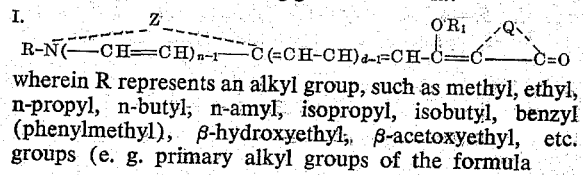

wherein R represents an alkyl group, such as methyl, ethyl, n-propyl, n-butyl, n-amyl, isopropyl, isobutyl, benzyl (phenylmethyl), $\beta$-hydroxyethyl, $\beta$-acetoxyethyl, etc. groups (e. g. primary alkyl groups of the formula $C_mH_{2m+1}$ wherein $m$ represents a positive integer of from 1 to 4), $R_1$ represents an alkyl group, such as methyl, ethyl, n-propyl, n-butyl, etc. groups, $n$ and $d$ each represents a positive integer of from 1 to 2, Z represents the non-metallic atoms necessary to complete a heterocyclic nucleus containing from five to six atoms in the heterocyclic ring, such as those selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. $\alpha$-naphthothiazole, $\beta$-naphthothiazole, 5-methoxy-$\beta$-naphthothiazole, 5-ethoxy-$\beta$-naphthothiazole, 8-methoxy-$\alpha$-naphthothiazole, 7-methoxy-$\alpha$-naphthothiazole, etc.), those of the thionaphtheno-7′,6′,4,5-thiazole series (e. g. 4′-methoxythianaphtheno-7′,6′,4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g. $\alpha$-naphthoxazole, $\beta$-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. $\alpha$-naphthoselenazole, $\beta$-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), the pyridine series (e. g. pyridine, 5-methylpyridine, etc.), etc., and Q represents the non-metallic atoms necessary to complete a nucleus selected from the group consisting of those of the 5(4)-thiazolone series, those of the 5(4)-oxazolone series, those of the 5(4)-isoxazolone series, and those of the 1,3-indandione series.

In accordance with my invention, I provide the dyes of Formula I above wherein $d$ is 1 by reacting together a compound selected from those represented by the following general formula:

II.

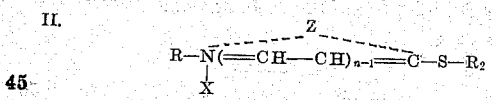

wherein R, $n$, and Z have the values given above, X represents an anion, such as chloride, bromide, iodide, perchlorate, sulfamate, thiocyanate, nitrate, p-toluenesulfonate, benzenesulfonate, methylsulfate, ethylsulfate, etc., and $R_2$ represents an alkyl group, such as methyl, ethyl, benzyl (phenylmethyl), etc. or an aryl group, such as phenyl, p-chlorophenyl, p-tolyl, etc., with a compound selected from those represented by the following general formula:

III.

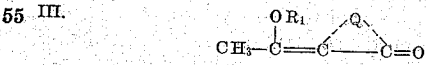

wherein $R_1$ and Q each have the values given above.

In accordance with my invention, I provide the dyes of Formula I above wherein $d$ is 2 by reacting, on condensing, together a compound selected from those represented by the following general formula:

IV.

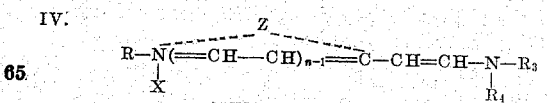

wherein R, $n$, X, and Z each have the values given above, $R_3$ represents an acyl group, such as acetyl, propionyl, benzoyl, etc., and $R_4$ represents an aryl group, such as phenyl, o-, m-, and p-tolyl, etc., with a compound selected from those represented by Formula III above.

The condensation of the compounds of Formula II with those of Formula III, or those of Formula IV with those of Formula III, can be carried out in the presence of a basic condensing agent, such as the trialkylamines (e. g. triethylamine, tri-n-propylamine, tri-n-butylamine, triisobutylamine, etc.), N-alkylpiperidines (e. g. N-methylpiperidine, N-ethylpiperidine, etc.), N,N-dialkylanilines (e. g. N,N-dimethylaniline, N,N-diethylaniline, etc.), etc. The condensations can advantageously be carried out in the presence of an inert solvent, such as pyridine, lower aliphatic alcohols (e. g. ethanol, n-propanol, n-butanol, etc.), 1,4-dioxane, etc. Heat accelerates the condensations, and temperatures varying from room temperature to reflux temperature can be used.

The intermediates of Formula III above wherein Q represents the non-metallic atoms necessary to complete a heterocyclic nucleus of the 5(4)-oxazolone series can be prepared according to the process described in Ilford British Patent 633,736, accepted December 19, 1949. The intermediates of Formula III wherein Q represents the non-metallic atoms necessary to complete an indandione or a 5(4)-isoxazolone nucleus can advantageously be prepared by condensing together a 1,3-indandione or 5(4)-isoxazolone with an alkyl orthoacetate selected from those represented by the following general formula:

V.
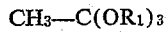

wherein $R_1$ has the values given above, in the presence of a carboxylic anhydride, such as acetic anhydride, propionic anhydride, etc. The intermediates of Formula III above wherein Q represents the non-metallic atoms necessary to complete a heterocyclic nucleus of the 5(4)-thiazolone series can advantageously be prepared according to the methods described by Cook et al., "Jour. Chem. Soc." (1949), pps. 1435–7, and in "The Chemistry of Penicillin," Princeton Univ. Press (1949), pg. 803. (For a further description, see the copending application Serial No. 211,566, filed February 17, 1951, in the names of Per Aubert and Edward B. Knott, now U. S. Patent 2,692,829, issued October 26, 1954 and my copending application Serial No. 224,714, filed May 5, 1951, now U. S. Patent 2,691,581, issued October 12, 1954.)

The following examples will serve to illustrate more fully the manner whereby I practice my invention.

*Example 1.—4-[α-ethoxy-2-(1-ethyl-2(1)-quinolylidene) ethylene]-2-ethylthio-5(4)-thiazolone*

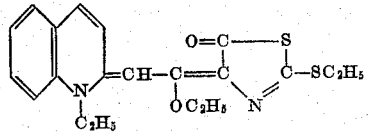

0.9 g. of N-dithiocarbethoxyglycine, 7 cc. of acetic anhydride, and 2.5 cc. of ethyl orthoacetate were heated at 120° C. for one hour allowing the alcohol to escape. The solvents were removed under reduced pressure, and 2.5 g. of 2-ethylthioquinoline etho-p-toluenesulfonate, 10 cc. of pyridine and 0.8 cc. of triethylamine were added. The whole was then refluxed for 30 minutes. 10 cc. of ethanol were added and the solution chilled. Crystallization set in and was completed by cautious addition of water (10 cc.). The dye (1.05 g., 54.5%) formed green crystals with a golden reflex, M. P. 176° C., from methanol. It sensitized a gelatino silver chlorobromide emulsion with a maximum at 590 mu.

*Example 2.—4-[α-ethoxy-2-(3-ethyl-2(3)-benzothioazolylidene)ethylidene]-2-phenyl-5(4)-oxazolone*

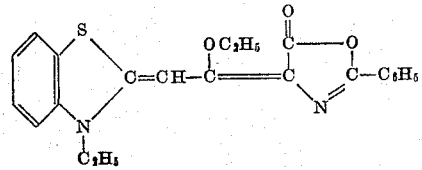

2.5 g. of 2-ethylthiobenzothiazole etho-p-toluenesulfonate, 1.15 g. of 4-(α-ethoxyethylidene)-2-phenyl-5(4)-oxazolone, 5 cc. of n-propanol, and 0.8 cc. of triethylamine were refluxed together for 10 minutes. The orange solution deposited the dye after chilling, and seeding with a stirring rod by scratching. The dye weighed 0.8 g. (50%) and formed orange threads, M. P. 198° C., from ethanol.

*Example 3.—4-[α-ethoxy-2-(1-ethyl-2(1)-quinolylidene) ethylidene]-2-phenyl-5(4)-oxazolone*

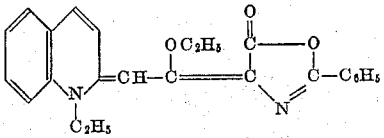

0.8 g. of 2-ethylthioquinoline etho-p-toluenesulfonate, 0.5 g. of 4-(α-ethoxyethylidene)-2-phenyl-5(4)-oxazolone, 5 cc. ethanol, and 0.4 cc. of triethylamine were refluxed together for 30 minutes. The mixture was chilled overnight, and 0.2 g. (10%) of crystals was collected. They formed violet laths, M. P. 146° C., from ethanol.

*Example 4.—4-[α-ethoxy-4-(1-ethyl-2(1)-quinolylidene)-but-2-enylidene]-2-phenyl-5(4)-oxazolone*

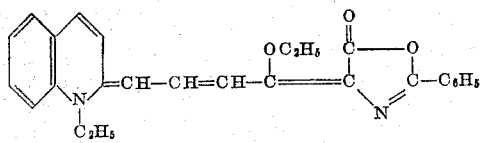

2.2 g. of 2-β-acetanilidovinylquinoline ethiodide, 1.5 g. of 4-(α-ethoxyethylidene)-2-phenyl-5(4)-oxazolone, 10 cc. of ethanol, and 0.8 cc. of triethylamine were refluxed together for 30 minutes. The dye (1.8 g., 87.5%) separated on chilling. It was dissolved in benzene and filtered free of insoluble matter. The filtrate was concentrated to about 5 cc. and 10 cc. of ethanol added. The dye M. P. 160° C., crystallized as brassy needles. It sensitized a gelatino silver chlorobromide emulsion with maxima lying at 595 and 645 mu.

*Example 5.—4-[α-ethoxy-4-(1-ethyl-2(1)-quinolylidene)-but-2-enylidene]-2-benzylthio-5(4)-thiazolone*

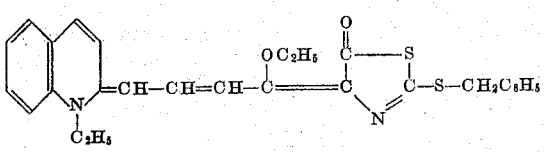

1.5 g. of 4-(α-ethoxyethylidene)-2-benzylthio-5(4)-thiazolone, 2.2 g. of 2-β-acetanilidovinylquinoline ethiodide, 10 cc. of ethanol, and 0.8 cc. of triethylamine were refluxed together for 30 minutes. After chilling and standing overnight the dye separated. It was dissolved in 20 cc. of benzene and insoluble matter (carbocyanine dye) filtered off. The filtrate was concentrated to 4 cc. and 15 cc. of ethanol added. The dye (1.1 g., 46.5%) formed glittering, dark green needles, M. P. 168° C., on chilling. It sensitized a gelatino silver chlorobromide emulsion with maxima lying at 675 and 730 mu.

The 4-(α-ethoxyethylidene)-2-benzylthio-5(4)-thiazolone used above was prepared as follows:

24.1 g. of N-dithiocarbobenzyloxyglycine, 30 cc. of ethyl orthoacetate, and 100 cc. of acetic anhydride were heated at 125° C. for one hour on an oil bath, the ethanol formed in the reaction being allowed to distill. Removal of the solvents from the solution at 120° C./10 mm. left a brown oil which was used directly in the dye condensations.

Examples 6 to 17 below describe various merodicarbocyanine (tetramethinemerocyanine) dyes. These dyes were prepared in the same manner as those of Examples 4 and 5 above, using either the 4-(α-ethoxyethylidene)-

2-phenyl-5(4)-oxazolone of Example 4 or the 4-(α-ethoxyethylidene)-2-benzylthio-5(4)-thiazolone of Example 5, together with the appropriate 2-β-acetanilidovinyl quaternary salt. The method of recrystallization was the same. In those cases where the dye tended to separate as an oil, the dye was obtained as crystals by seeding (i. e. "inoculation").

*Example 6.*—*4 - [α - ethoxy - 4 - (3 - ethyl - 2(3)-benzoxazolylidene)but - 2 - enylidene] - 2 - phenyl-5(4)-oxazolone*

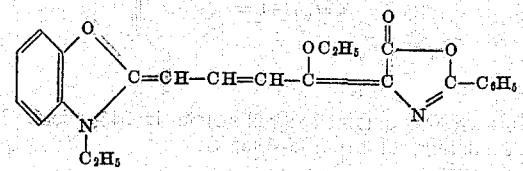

This dye was obtained as magenta threads in 85% yield. It had a melting point of 191° C.

*Example 7.*—*4 - [α - ethoxy - 4 - (3 - ethyl - 2(3)-benzoxazolylidene)but - 2 - enylidene] - 2 - benzylthio-5-(4)-thiazolone*

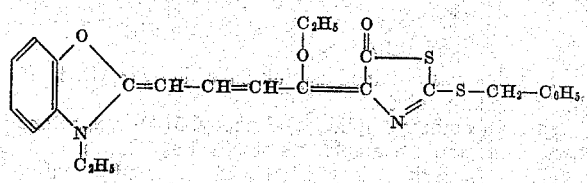

This dye was obtained as blue needles in 35% yield. It had a melting point of 122° C. and sensitized a photographic gelatino silver chlorobromide emulsion with maxima at 570 and 630 mu, and a photographic gelatino silver bromiodide emulsion with a maximum at 620 mu.

*Example 8.*—*4 - [α - ethoxy - 4 - (3 - ethyl - 2(3)-benzothiazolylidene)but - 2 - enylidene] - 2 - phenyl-5(4)-oxazolone*

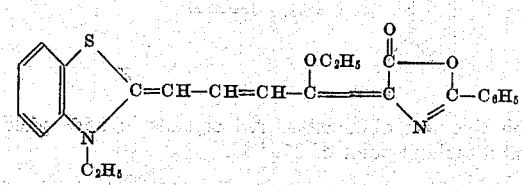

This dye was obtained as mauve threads in 87% yield. It had a melting point of 178° C. and sensitized a photographic gelatino silver chlorobromide emulsion with a maximum at 600 mu and a photographic gelatino silver bromiodide emulsion with a maximum at 595 mu.

*Example 9.*—*4 - [α - ethoxy - 4 - (3 - ethyl - 2(3)-benzothiazolylidene)but - 2 - enylidene] - 2 - benzylthio-5(4)-thiazolone*

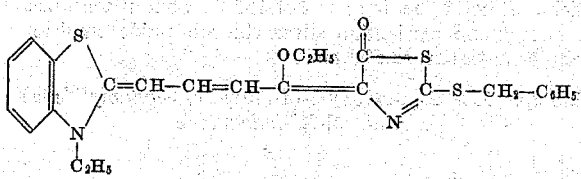

This dye was obtained as brilliant green crystals in 50% yield. It had a melting point of 142° C. and it sensitized a photographic gelatino silver chlorobromide emulsion with maxima at 560 and 590 mu and a photographic gelatino silver bromiodide emulsion with maxima at 610 and 650 mu.

*Example 10.*—*4 - [α - ethoxy - 4 - (3 - ethyl - 2(3)-benzoselenazolylidene)but - 2 - enylidene] - 2 - phenyl-5(4)-oxazolone*

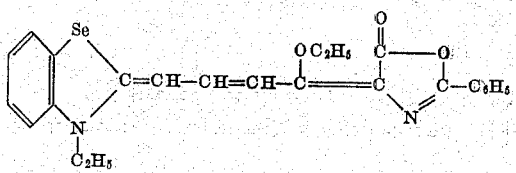

This dye was obtained as grey-green threads in 90% yield. It had a melting point of 156° C. and it sensitized a photographic gelatino silver chlorobromide emulsion with a maximum at 620 mu and a photographic gelatino silver bromiodide emulsion with maxima at 570 mu and 630 mu.

*Example 11.*—*4 - [α - ethoxy - 4 - (3 - ethyl - 2(3)-benzoselenazolylidene)but - 2 - enylidene] - 2 - benzylthio-5(4)-thiazolone*

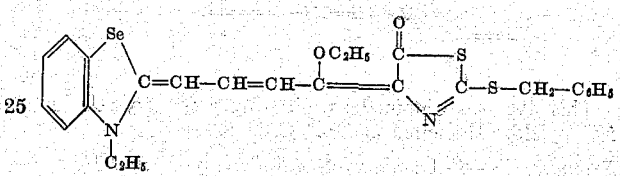

This dye was obtained as glittering, dark green needles in 61% yield. It had a melting point of 128° C. and it sensitized a photographic gelatino silver chlorobromide emulsion with maxima at 590 and 680 mu and a photographic gelatino silver bromiodide emulsion with maxima at 610 and 650 mu.

*Example 12.*—*4 - [α - ethoxy - 4 - (3 - methyl - 2(3)-thiazolinylidene)but - 2 - enylidene] - 2 - phenyl-5(4)-oxazolone*

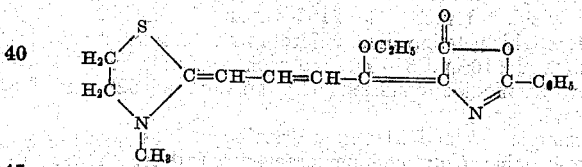

This dye was obtained as dark maroon flakes in 68% yield. It had a melting point of 207° C.

*Example 13.*—*4 - [α - ethoxy - 4 - (3 - methyl - 2(3)-thiazolinylidene)but - 2 - enylidene] - 2 - benzylthio-5(4)-thiazolone*

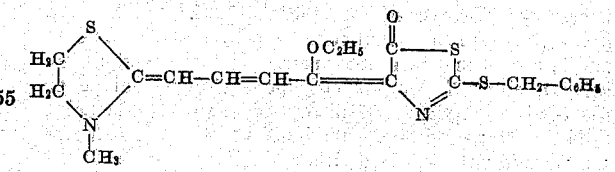

This dye was obtained as glossy, steel-blue spears in 33.5% yield. It had a melting point of 126° C. and it sensitized a photographic gelatino silver chlorobromide emulsion with maxima at 530 and 640 mu and a photographic gelatino silver bromiodide emulsion with maxima at 570 and 610 mu.

*Example 14.*—*4 - [α - ethoxy - 4 - (1,3,3 - trimethyl-2(1) - indolylidene)but - 2 - enylidene] - 2 - phenyl-5(4)-oxazolone*

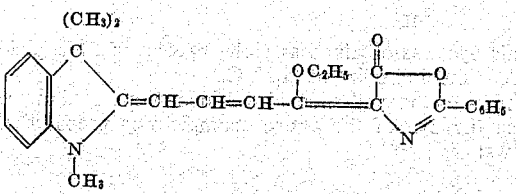

This dye was obtained as soft, glossy violet flakes in 58% yield. It had a melting point of 174° C.

*Example 15.*—*4 - [α - ethoxy - 4 - (1,3,3 - trimethyl - 2(1)-indolylidene) but - 2 - enylidene]-2-benzylthio-5(4) thiazolone*

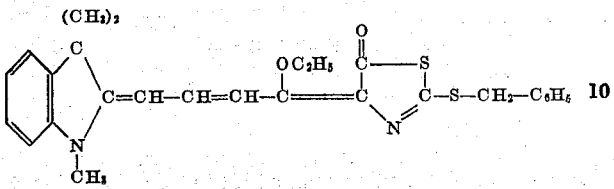

This dye was obtained as jagged, steel-blue needles in 42% yield. It had a melting point of 155° C.

*Example 16.*—*4-[α-ethoxy-4-(1-ethyl-4(1) - quinolylidene) but-2-enylidene]-2-phenyl-5(4)-oxazolone*

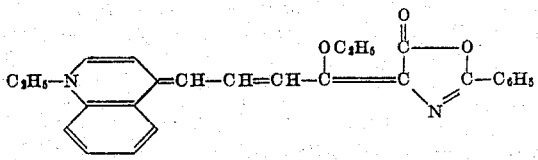

This dye was obtained as glittering green crystals in 57% yield. It melted at 202° C.

*Example 17.*—*4 - [α-ethoxy-4-(4,5-diphenyl-3-ethyl-2(3)-thiazolylidene) but - 2 - enylidene]-2 - phenyl-5(4)-oxazolone*

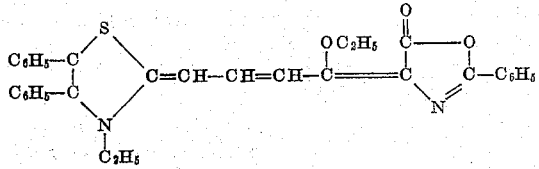

This dye was obtained as glittering green crystals in 35% yield. It melted at 210° C. and it sensitized a photographic gelatino silver chlorobromide emulsion with maxima at 610 and 650 mu and a photographic gelatino silver bromiodide emulsion with maxima at 620 and 660 mu.

Examples 18 and 21 below describe various merodicarbo-cyanine (tetramethinemerocyanine) dyes. These dyes were prepared in the same manner as those of Examples 4 and 5 above, using 2-(α-ethoxyethylidene)-1,3-indandione and 4 - (α - ethoxyethylidene)-3-phenyl-5(4)-isoxazolone, respectively, together with the appropriate 2-β-acetanilidovinyl quaternary salt. The method of recrystallization was the same, seeding being used where necessary. The dyes of Examples 19, 20, 22, and 23 were prepared in the same manner as the dyes of Examples 1 and 2, except that benzene was used as the recrystallizing solvent, either 2-(α-ethoxyethylidene)-1,3-indandione or 4-( α- ethoxyethylidene)-3-phenyl-5(4)-isoxazolone being used together with 2 - ethylthiobenzothiazole etho-p-toluenesulfonate or 2-ethylthioquinoline etho-p-toluenesulfonate.

*Example 18.*—*2-[α - ethoxy-4-(3-ethyl-2(3)-benzoxazolylidene) but-2-enylidene]-1,3-indandione*

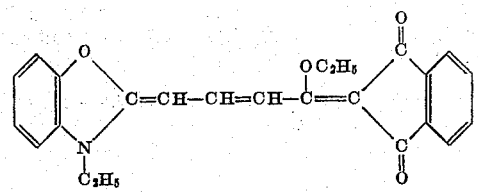

This dye was obtained as violet needles in 57% yield. It had a melting point of 202° C.

The 2-(α-ethoxyethylidene)-1,3-indandione used in preparing the dye of the above example was prepared as follows:

14.6 g. of 1,3-indandione, 25 cc. of ethyl orthoacetate and 25 cc. of acetic anhydride were heated together on an oil bath at 140° C. for one hour. The solvents were removed under reduced pressure and the solid residue recrystallized from ethanol. It weighed 12.7 g. (59% yield) and formed brown needles, M. P. 95–111° C.

*Example 19.*—*2 - [α-ethoxy-2-(3-ethyl-2(3)-benzothiazolylidene) ethylidene]-1,3-indandione*

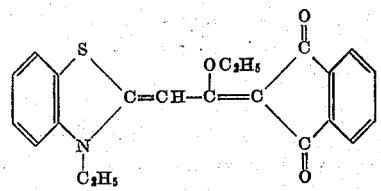

This dye was obtained as red needles in 74% yield. It had a melting point of 195–196° C.

*Example 20.*—*4[α-ethoxy-2-(3-ethyl-2(3)-benzothiazolylidene) ethylidene]-3-phenyl-5(4)-isoxazolone*

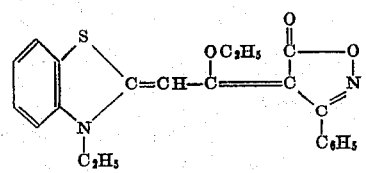

This dye was obtained as pink flakes in 47% yield. It had a melting point of 185° C.

The 4-(α-ethoxyethylidene)-3-phenyl-5(4)-isoxazolone used in the above example was obtained as follows:

17.1 g. of 3-phenylisoxazolone, 25 cc. of ethyl orthoacetate, and 25 cc. of acetic anhydride were heated for one hour at 125° C. on an oil bath. The removal of the solvent left a brown oil which soon crystallized. From ethanol, it (14.5 g., 63%) formed pale brown plates or aggregates having a melting point of 113° C.

*Example 21.*—*4-[α-ethoxy-4-(3-ethyl-2(3)-benzoxazolylidene) but-2-enylidene]-3-phenyl-5(4)-isoxazolone*

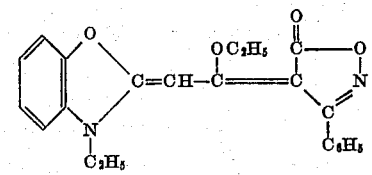

This dye was obtained as red crystals in 55% yield. It had a melting point of 215° C.

*Example 22.*—*4-[α-ethoxy-2-(1-ethyl-2(1)-quinolylidene) ethylidene]-3-phenyl-5(4)-isoxazolone*

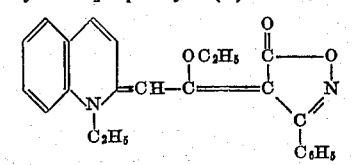

This dye was obtained as garnet aggregates in 41% yield. It had a melting point of 195° C., and it sensitized a photographic gelantino silver chlorobromide emulsion with a maximum at 590 mu.

*Example 23.*—*2-[α-ethoxy-2-(1-ethyl-2(1)-quinolylidene) ethylidene]-1,3-indandione*

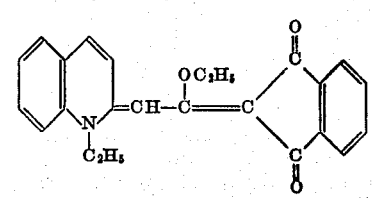

This dye was obtained as green needles in 22% yield. It had a melting point of 206° C.

As shown in a number of the above examples, the new dyes of my invention are useful in spectrally sensitizing photographic silver halide emulsions when incorporated therein. The dyes are especially useful for extending the spectral sensitivity of the customarily employed gelatino silver chloride, gelatino silver chlorobromide, gelatino silver bromide, gelatino silver bromiodide, and gelatino silver chlorobromiodide developing-out emulsions. In several of the foregoing examples, the point of maximum sensitivity of gelatino silver chlorobromide and/or gelatino silver bromiodide emulsions sensitized with my new dyes is pointed out in connection with the description of the properties of certain of the dyes. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of my new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my new dyes, the following procedure is satisfactory:

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of my dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

What I claim as my invention and desire secured by Letters Patent of the United States is:

1. The merocarbocyanine dye having the following formula:

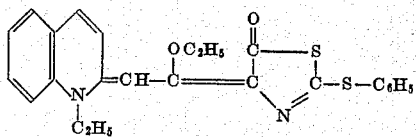

2. The merocarbocyanine dye having the following formula:

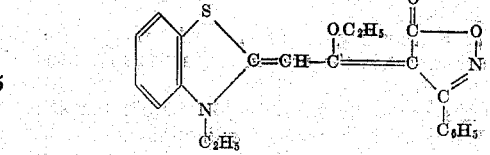

3. The merodicarbocyanine dye having the following formula:

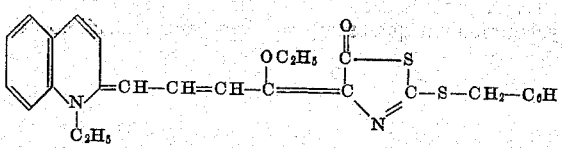

4. The merodicarbocyanine dye having the following formula:

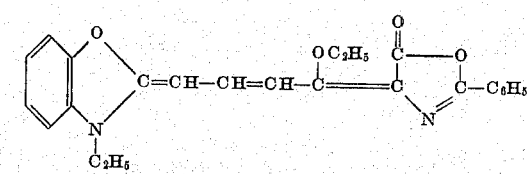

5. The merodicarbocyanine dye having the following formula:

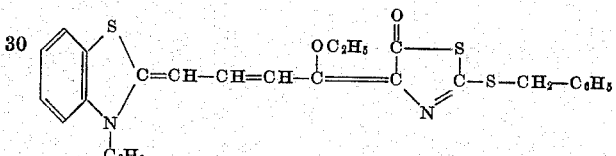

6. A process for preparing a merocyanine dye comprising condensing a cyclammonium quaternary salt selected from the group consisting of those represented by the following two general formulas:

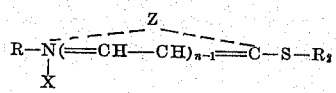

and

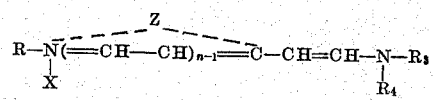

wherein R represents an alkyl group of from 1 to 4 carbon atoms, $R_2$ represents a member selected from the group consisting of an alkyl group containing from 1 to 7 carbon atoms and a monocyclic aryl group, $R_3$ represents a carboxylic acyl group, $R_4$ represents a monocyclic aryl group, X represents an anion, $n$ represents a positive integer of from 1 to 2, and Z represents the non-metallic atoms necessary to complete a heterocyclic nucleus selected from the group consisting of those of the thiazole series, those of the benzothiazole series, those of the naphthothiazole series, those of the thianaphtheno-7′,6′,4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, and those of the pyridine series, together with a compound selected from those represented by the following general formula:

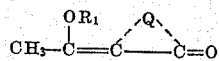

wherein $R_1$ represents an alkyl group and Q represents the nonmetallic atoms necessary to complete a nucleus selected from the group consisting of those of the 5(4)- thiazolone series, those of the 5(4)-oxazolone series, those of the 5(4)-isoxazolone series, and those of the 1,3-indandione series.

7. A process according to claim 6 wherein the said process is carried out in the presence of a basic condensing agent.

8. A process according to claim 6 wherein the said cyclammonium quaternary salt is a quinolinium salt.

9. A process according to claim 6 wherein the said cyclammonium quaternary salt is a benzoxazolium salt.

10. A process according to claim 6 wherein the said cyclammonium quaternary salt is a benzothiazolium salt.

References Cited in the file of this patent

UNITED STATES PATENTS

| | | |
|---|---|---|
| 2,185,343 | Keyes | June 2, 1940 |
| 2,478,366 | Brooker | Aug. 9, 1941 |
| 2,494,031 | Brooker | Jan. 10, 1950 |
| 2,556,545 | Kendall | June 12, 1951 |
| 2,692,829 | Aubert | Oct. 26, 1954 |

FOREIGN PATENTS

| | | |
|---|---|---|
| 466,097 | Great Britain | 1937 |